United States Patent
Okuma

(10) Patent No.: US 12,449,272 B2
(45) Date of Patent: Oct. 21, 2025

(54) MAP GENERATION APPARATUS

(71) Applicant: Honda Motor, Co., Ltd., Tokyo (JP)

(72) Inventor: Yuki Okuma, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 260 days.

(21) Appl. No.: 18/124,501

(22) Filed: Mar. 21, 2023

(65) Prior Publication Data
US 2023/0314165 A1  Oct. 5, 2023

(30) Foreign Application Priority Data
Mar. 30, 2022 (JP) ................. 2022-055151

(51) Int. Cl.
*G01C 21/00* (2006.01)

(52) U.S. Cl.
CPC ...... *G01C 21/3822* (2020.08); *G01C 21/3811* (2020.08); *G01C 21/3837* (2020.08); *G01C 21/3848* (2020.08)

(58) Field of Classification Search
CPC ............ G01C 21/3822; G01C 21/3811; G01C 21/3837; G01C 21/3848; B60W 40/00; B60W 40/06; B60W 50/00; B60W 60/001; B60W 2050/0005; B60W 2050/0043
See application file for complete search history.

(56) References Cited

U.S. PATENT DOCUMENTS

| | | | |
|---|---|---|---|
| 9,123,152 B1 * | 9/2015 | Chatham | G01C 21/30 |
| 11,514,588 B1 * | 11/2022 | Musa | G06T 7/579 |
| 2010/0104199 A1 * | 4/2010 | Zhang | G08G 1/166 |
| | | | 382/199 |
| 2019/0033459 A1 * | 1/2019 | Tisdale | G06V 10/751 |
| 2019/0033867 A1 * | 1/2019 | Sharma | G06T 7/73 |
| 2019/0333389 A1 * | 10/2019 | Wang | G06T 7/73 |
| 2021/0199463 A1 * | 7/2021 | Kitahara | G01C 21/3815 |

FOREIGN PATENT DOCUMENTS

JP    2014104853 A    6/2014

* cited by examiner

*Primary Examiner* — Anne Marie Antonucci
*Assistant Examiner* — Luis G Del Valle
(74) *Attorney, Agent, or Firm* — Duft & Bornsen, PC

(57) ABSTRACT

A map generation apparatus including a division line detection part, a feature point detection part and a microprocessor. The microprocessor is configured to perform generating a first map including position information of the division line detected by the division line detection part, generating a second map including position information of the feature points detected by the feature point detection part, and determining whether a position of the division line has changed, the determining including determining that the position of the division line has changed when a degree of difference between two first maps respectively generated at a first time point and a second time point after the first time point is a first predetermined degree or more and a degree of difference between two second maps respectively generated at the first time point and the second time point is a second predetermined degree or more.

8 Claims, 5 Drawing Sheets

MAP GENERATION APPARATUS

CROSS-REFERENCE TO RELATED APPLICATION

This application is based upon and claims the benefit of priority from Japanese Patent Application No. 2022-055151 filed on Mar. 30, 2022, the content of which is incorporated herein by reference.

BACKGROUND OF THE INVENTION

Field of the Invention

This invention relates to a map generation apparatus configured to generate a map including a road map.

Description of the Related Art

At this type of apparatus, conventionally, there is a known apparatus that is configured to recognize a division line (a white line) using an image captured by a camera mounted on a vehicle, and use a recognition result of the division line for a vehicle travel control. Such an apparatus is disclosed, for example, in Japanese Unexamined Patent Publication No. 2014-104853 (JP2014-104853A). The apparatus disclosed in JP2014-104853A extracts an edge point at which a change in luminance in the captured image is equal to or greater than a threshold, and recognizes a division line based on the edge point.

However, since the device disclosed in JP2014-104853A recognizes the division line using the camera image, there is a possibility that the division line may be erroneously detected. For this reason, there is a possibility that it is erroneously determined that there is no shift in the position of the recognized division line although the position of the recognized division line has actually shifted.

SUMMARY OF THE INVENTION

An aspect of the present invention is a map generation apparatus including a division line detection part detecting a division line on a road surface around a vehicle, a feature point detection part detecting feature points of an object around the vehicle, and an electronic control unit including a microprocessor and a memory connected to the microprocessor. The microprocessor is configured to perform generating a first map including position information of the division line detected by the division line detection part, and generating a second map including position information of the feature points detected by the feature point detection part. The first map includes a first time first map including the position information of the division line detected by the division line detection part at a first time point and a second time second map including the position information of the division line detected by the division line detection part at a second time point later than the first time point, and the second map includes a first time second map including the position information of the feature points detected by the feature point detection part at the first time point and a second time second map including the position information of the feature point detected by the feature point detection part at the second time point. The memory is configured to store the first time first map and the first time second map. The microprocessor is further configured to further perform determining whether a position of the division line has changed, and the microprocessor is configured to perform the determining including determining that the position of the division line has changed when a degree of a difference between the first time first map stored in the memory and the second time first map is greater than or equal to a first predetermined degree and a degree of a difference between the first time second map stored in the memory and the second time second map is greater than or equal to a second predetermined degree.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention is explained with reference to FIGS. 1 to 5. A map generation apparatus according to an embodiment of the invention is configured to generate a map used, for example, when a vehicle having a self-driving capability, i.e., self-driving vehicle travels. The vehicle having the map generation apparatus may be sometimes called "subject vehicle" to differentiate it from other vehicles.

The map generation apparatus generates the map when the subject vehicle is manually driven by a driver. Therefore, the map generation apparatus is provided with a manual driving vehicle not having the self-driving capability. The map generation apparatus can be provided with not only the manual driving vehicle, but also the self-driving vehicle capable of switching from a self-drive mode in which a driving operation by the driver is unnecessary to a manual drive mode in which the driving operation by the driver is necessary. In the following, an example of the map generation apparatus provided with the self-driving vehicle will be described.

Figure 1:
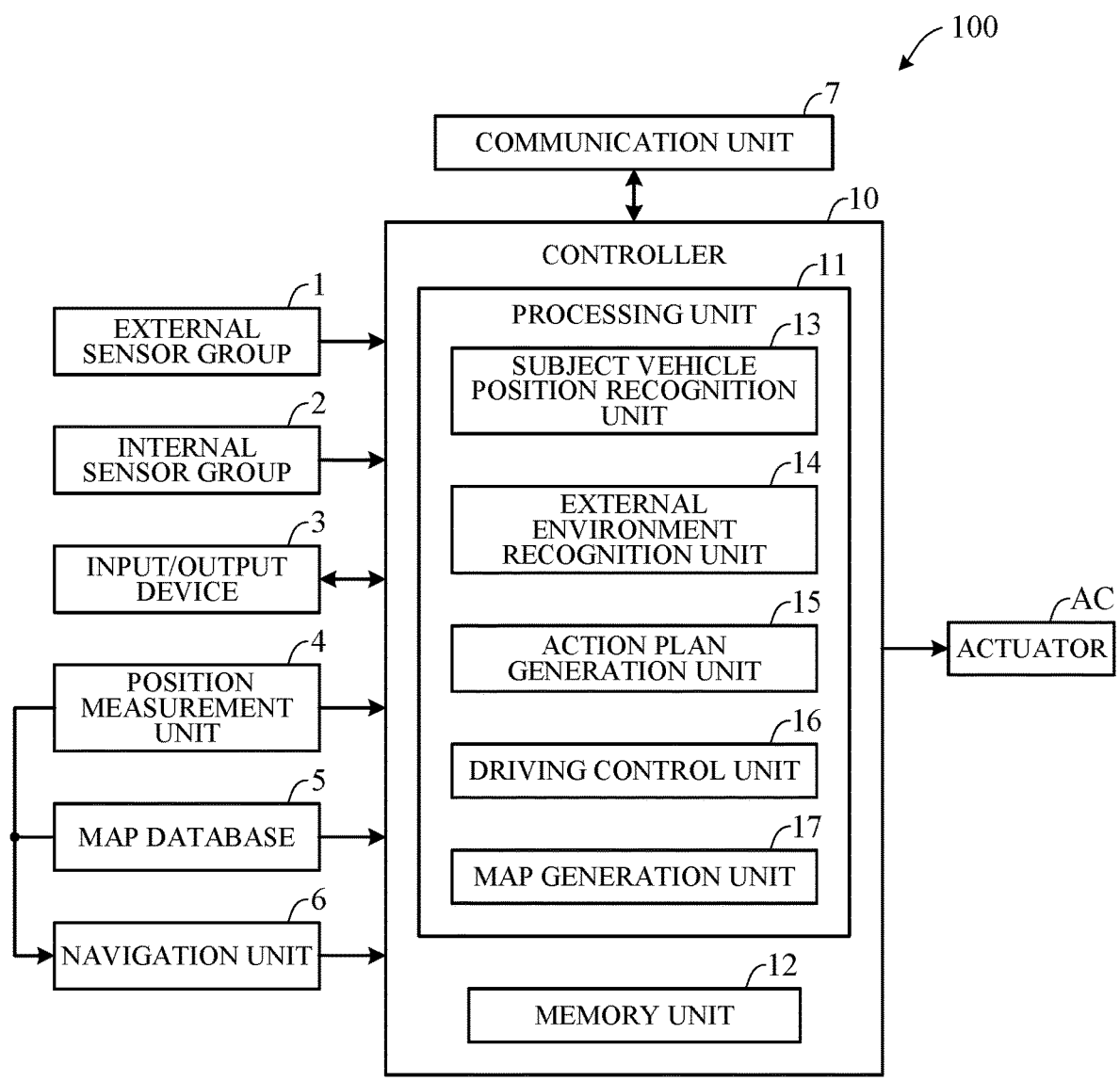
FIG. 1 is a block diagram schematically illustrating an overall configuration of a vehicle control system having a map generation apparatus according to an embodiment of the present invention.

First, a configuration of the self-driving vehicle will be explained. The subject vehicle is an engine vehicle having an internal combustion engine (engine) as a travel drive source, electric vehicle having a travel motor as the travel drive source, or hybrid vehicle having both of the engine and the travel motor as the travel drive source. FIG. 1 is a block diagram schematically illustrating an overall configuration of a vehicle control system 100 of the subject vehicle having the map generation apparatus according to an embodiment of the present invention.

As shown in FIG. 1, the vehicle control system 100 mainly includes a controller 10, and an external sensor group 1, an internal sensor group 2, an input/output device 3, a position measurement unit 4, a map database 5, a navigation unit 6, a communication unit 7 and actuators AC which are communicably connected with the controller 10.

The term external sensor group 1 herein is a collective designation encompassing multiple sensors (external sensors) for detecting external circumstances constituting subject vehicle ambience data. For example, the external sensor group 1 includes, inter alia, a LIDAR (Light Detection and Ranging) for measuring distance from the subject vehicle to ambient obstacles by measuring scattered light produced by laser light radiated from the subject vehicle in every direction, a RADAR (Radio Detection and Ranging) for detecting other vehicles and obstacles around the subject vehicle by radiating electromagnetic waves and detecting reflected waves, and a CCD, CMOS or other image sensor-equipped on-board cameras for imaging subject vehicle ambience (forward, reward and sideways).

The term internal sensor group 2 herein is a collective designation encompassing multiple sensors (internal sensors) for detecting driving state of the subject vehicle. For example, the internal sensor group 2 includes, inter alia, a vehicle speed sensor for detecting vehicle speed of the subject vehicle, acceleration sensors for detecting forward-rearward direction acceleration and lateral acceleration of the subject vehicle, respectively, rotational speed sensor for detecting rotational speed of the travel drive source, and the like. The internal sensor group 2 also includes sensors for detecting driver driving operations in manual drive mode, including, for example, accelerator pedal operations, brake pedal operations, steering wheel operations and the like.

The term input/output device 3 is used herein as a collective designation encompassing apparatuses receiving instructions input by the driver and outputting information to the driver. The input/output device 3 includes, inter alia, switches which the driver uses to input various instructions, a microphone which the driver uses to input voice instructions, a display for presenting information to the driver via displayed images, and a speaker for presenting information to the driver by voice.

The position measurement unit (GNSS unit) 4 includes a position measurement sensor for receiving a signal from positioning satellites to measure the location of the subject vehicle. The position measurement sensor may be included in the internal sensor group 2. The positioning satellites are satellites such as GPS satellites and Quasi-Zenith satellites. The position measurement unit 4 measures absolute position (latitude, longitude and the like) of the subject vehicle based on signals received by the position measurement sensor.

The map database 5 is a unit storing general map data used by the navigation unit 6 and is, for example, implemented using a magnetic disk or semiconductor element. The map data includes road position data and road shape (curvature etc.) data, along with intersection and road branch position data. The map data stored in the map database 5 is different from high-accuracy map data stored in a memory unit 12 of the controller 10.

The navigation unit 6 retrieves target road routes to destinations input by the driver and performs guidance along selected target routes. Destination input and target route guidance is performed through the input/output device 3. Target routes are computed based on the current position of the subject vehicle measured by the position measurement unit 4 and map data stored in the map database 35. The current position of the subject vehicle can be measured, using the values detected by the external sensor group 1, and on the basis of this current position and high-accuracy map data stored in the memory unit 12, a target route may be calculated.

The communication unit 7 communicates through networks including the Internet and other wireless communication networks to access servers (not shown in the drawings) to acquire map data, travel history information, traffic data and the like, periodically or at arbitrary times. The networks include not only public wireless communications network, but also closed communications networks, such as wireless LAN, Wi-Fi and Bluetooth, which are established for a predetermined administrative area. Acquired map data is output to the map database 5 and/or memory unit 12 via the controller 10 to update their stored map data. The subject vehicle can also communicate with other vehicles via the communication unit 7.

The actuators AC are actuators for traveling of the subject vehicle. If the travel drive source is the engine, the actuators AC include a throttle actuator for adjusting an opening angle of the throttle valve of the engine (throttle opening angle). If the travel drive source is the travel motor, the actuators AC include the travel motor. The actuators AC also include a brake actuator for operating a braking device and turning actuator for turning the front wheels FW.

The controller 10 is constituted by an electronic control unit (ECU). More specifically, the controller 10 incorporates a computer including a CPU or other processing unit (a microprocessor) 51 for executing a processing in relation to travel control, the memory unit (a memory) 12 of RAM, ROM and the like, and an input/output interface or other peripheral circuits not shown in the drawings. In FIG. 1, the controller 10 is integrally configured by consolidating multiple function-differentiated ECUs such as an engine control ECU, a transmission control ECU and so on. Optionally, these ECUs can be individually provided.

The memory unit 12 stores high-accuracy detailed road map data (road map information). This road map information includes information on road position, information on road shape (curvature, etc.), information on the gradient of the road, information on the position of intersections and branches, information on the number of lanes, information on the width of the lane and the position of each lane (center position of the lane and boundary line of the lane), information on the position of landmarks (traffic lights, signs, buildings, etc.) as a mark on the map, and information on the road surface profile such as unevennesses of the road surface, etc. The map information stored in the memory unit 12 includes map information acquired from outside of the subject vehicle through the communication unit 7, and map information created by the subject vehicle itself using the detection values of the external sensor group 1 or the detection values of the external sensor group 1 and the internal sensor group 2.

As functional configurations in relation to mainly self-driving, the processing unit 11 includes a subject vehicle position recognition unit 13, an external environment recognition unit 14, an action plan generation unit 15, a driving control unit 16, and a map generation unit 17.

The subject vehicle position recognition unit 13 recognizes the position of the subject vehicle (subject vehicle position) on the map based on position information of the subject vehicle calculated by the position measurement unit 4 and map information stored in the map database 5.

Optionally, the subject vehicle position can be recognized using map information stored in the memory unit 12 and ambience data of the subject vehicle detected by the external sensor group 1, whereby the subject vehicle position can be recognized with high accuracy. Optionally, when the subject vehicle position can be measured by sensors installed externally on the road or by the roadside, the subject vehicle position can be recognized by communicating with such sensors through the communication unit 7.

The external environment recognition unit 14 recognizes external circumstances around the subject vehicle based on signals from cameras, LIDERs, RADARs and the like of the external sensor group 1. For example, it recognizes position, speed and acceleration of nearby vehicles (forward vehicle or rearward vehicle) driving in the vicinity of the subject vehicle, position of vehicles stopped or parked in the vicinity of the subject vehicle, and position and state of other objects. Other objects include traffic signs, traffic lights, road division lines (white lines, etc.) and stop lines, buildings, guardrails, power poles, commercial signs, pedestrians, bicycles, and the like. Recognized states of other objects include, for example, traffic light color (red, green or yellow) and moving speed and direction of pedestrians and bicycles.

The action plan generation unit 15 generates a driving path (target path) of the subject vehicle from present time point to a certain time ahead based on, for example, a target route computed by the navigation unit 6, map information stored in the memory unit 12, subject vehicle position recognized by the subject vehicle position recognition unit 13, and external circumstances recognized by the external environment recognition unit 14. When multiple paths are available on the target route as target path candidates, the action plan generation unit 15 selects from among them the path that optimally satisfies legal compliance, safe efficient driving and other criteria, and defines the selected path as the target path. The action plan generation unit 15 then generates an action plan matched to the generated target path. An action plan is also called "travel plan". The action plan generation unit 15 generates various kinds of action plans corresponding to overtake traveling for overtaking the forward vehicle, lane-change traveling to move from one traffic lane to another, following traveling to follow the preceding vehicle, lane-keep traveling to maintain the same lane, deceleration or acceleration traveling. When generating a target path, the action plan generation unit 15 first decides a drive mode and generates the target path in line with the drive mode.

In self-drive mode, the driving control unit 16 controls the actuators AC to drive the subject vehicle along the target path generated by the action plan generation unit 15. More specifically, the driving control unit 16 calculates a required driving force for achieving the target accelerations of sequential unit times calculated by the action plan generation unit 15, taking running resistance caused by the road gradient and the like into account. And, the driving control unit 16 feedback-controls the actuators AC to bring actual acceleration detected by the internal sensor group 2, for example, into coincidence with a target acceleration. In other words, the driving control unit 16 controls the actuators AC so that the subject vehicle travels at a target speed and target acceleration. On the other hand, in manual drive mode, the driving control unit 16 controls the actuators AC in accordance with driving instructions by the driver (steering operation and the like) acquired from the internal sensor group 2.

The map generation unit 17 generates the environment map constituted by three-dimensional point cloud data using detection values detected by the external sensor group 1 during traveling in the manual drive mode. Specifically, an edge indicating an outline of an object is extracted from a camera image acquired by the camera based on luminance and color information for each pixel, and a feature point is extracted using the edge information. The feature point is, for example, points on the edges or an intersection of the edges, and corresponds to a division line on the road surface, a corner of a building, a corner of a road sign, or the like. The map generation unit 17 determines distances to the extracted feature points and sequentially plots the extracted feature points on the map by using the distances, thereby generating the map around the road on which the subject vehicle has traveled. The map may be generated by extracting the feature points of an object around the subject vehicle using data acquired by radar or LIDAR instead of the camera.

The subject vehicle position recognition unit 13 performs subject vehicle position estimation processing in parallel with map creation processing by the map generation unit 17. That is, the position of the subject vehicle is estimated based on a change in the position of the feature point over time. The map creation processing and the position estimation processing are simultaneously performed, for example, according to an algorithm of SLAM (Simultaneous Localization and Mapping) using a signal from the camera or the LIDAR, or the like. The map generation unit 17 can generate the map not only when the vehicle travels in the manual drive mode but also when the vehicle travels in the self-drive mode. If the map has already been generated and stored in the memory unit 12, the map generation unit 17 may update the map with a newly obtained feature point.

Figure 2A:
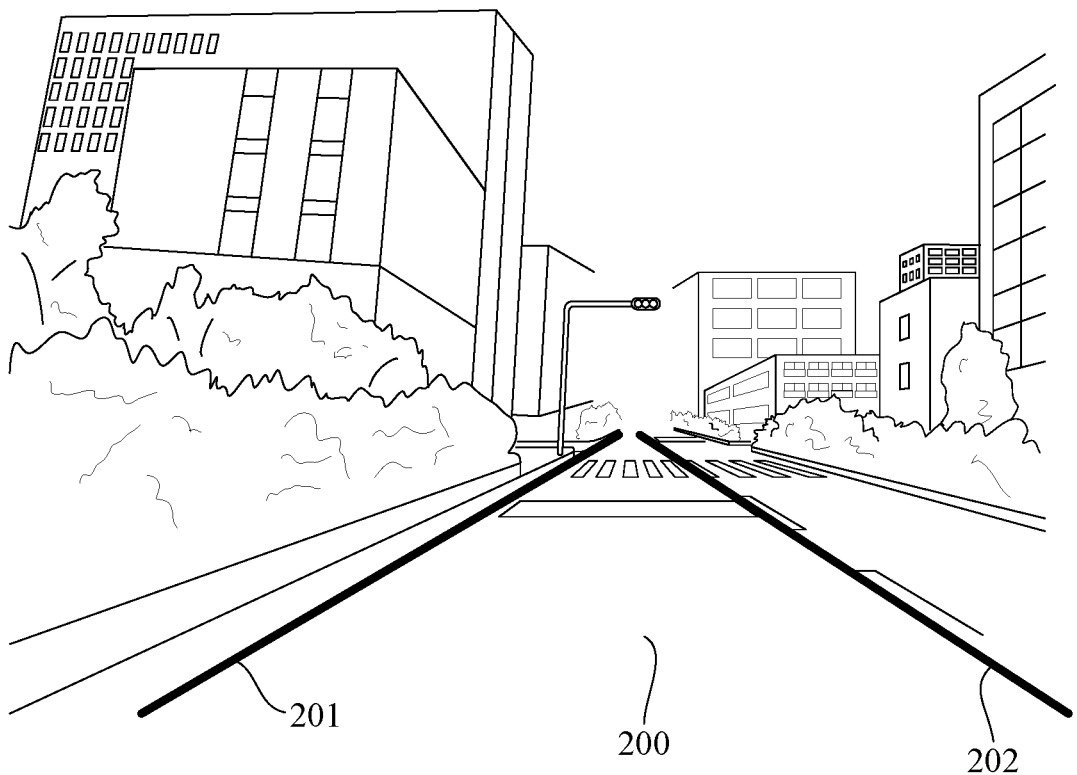
FIG. 2A is a view illustrating an example of a road structure to which the map generation apparatus according to the embodiment of the present invention is applied.
Figure 2B:
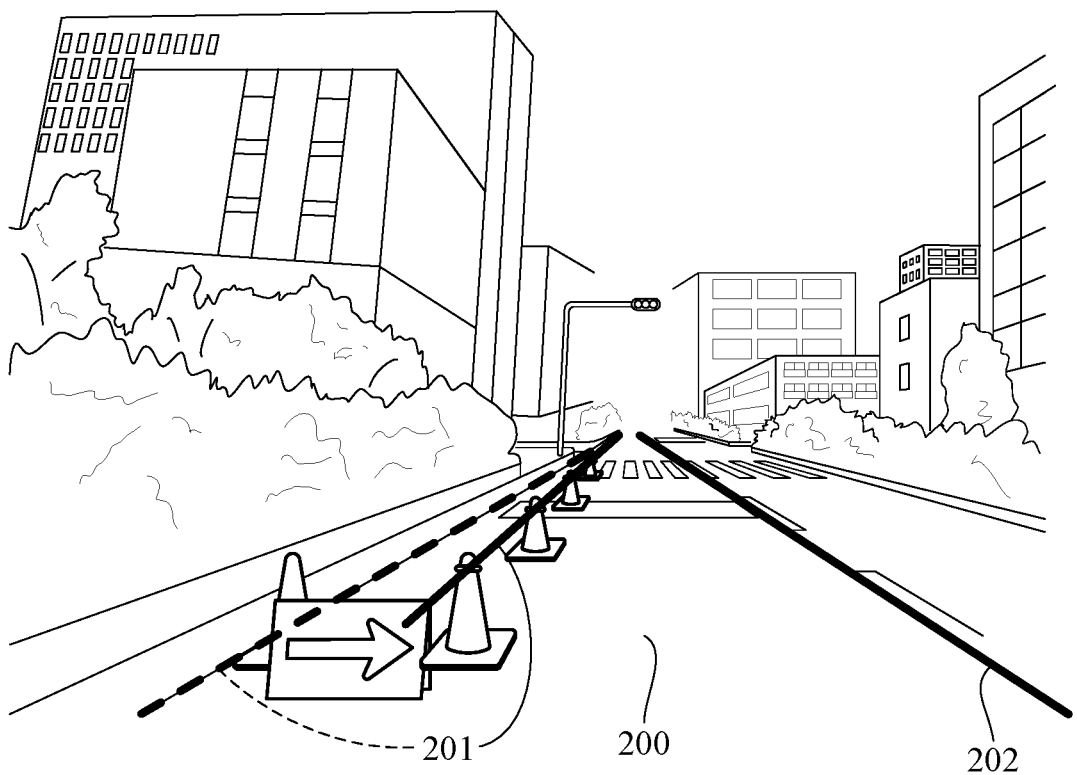
FIG. 2B is a view illustrating another example of the road structure to which the map generation apparatus according to the embodiment of the present invention is applied.

Next, a configuration of the map generation apparatus according to the present embodiment, that is, the map generation apparatus of the vehicle control system 100, will be described. FIGS. 2A and 2B are diagrams each illustrating an example of a road structure to which the map generation apparatus according to the present embodiment is applied. FIGS. 2A and 2B are images (camera images) acquired by an in-vehicle camera around a road at the same point. Specifically, FIG. 2A is an image captured at a first time point T1 (e.g., a past time point of several months ago), and FIG. 2B is an image captured at a second time point T2 (e.g., a current time point) after the first time point T1.

As illustrated in FIG. 2A, the camera image includes a pair of left and right division lines 201 and 202 defining a traffic lane 200 as a target. Each of the division lines 201 and 202 is a white line or a boundary line between a road and a sidewalk. The division lines 201 and 202 extend in a traveling direction of the subject vehicle, and the division lines 201 and 202 can be recognized and the positions of the division lines 201 and 202 with respect to the position of the subject vehicle can be calculated by recognizing a linear edge image extending along the traveling direction of the subject vehicle in the camera image. In FIG. 2A, the division lines 201 and 202 are emphasized for convenience.

FIG. 2B illustrates a state in which road construction is being performed at a boundary between a road and a sidewalk. A plurality of substantially conical obstacles (pylons) are placed at an end portion of the road, and a boundary of the road is defined by a bar-shaped member (a cone bar) connecting the plurality of obstacles to one another. For this reason, the division line 201 (the division line defined by the bar-shaped member) on the sidewalk side in FIG. 2B shifts from its position (dotted line) in FIG. 2A (solid line). Unlike a map acquired from the outside of the subject vehicle via the communication unit 7, a map generated by the map generation unit 17 can be updated every time the subject vehicle travels for the purpose of map generation. Therefore, a latest road map reflecting the change in road structure as illustrated in FIG. 2B can be generated, and the self-driving can be performed using the latest map.

Incidentally, the calculation of the position based on the camera image may include an error due to the influence of weather or the like. For this reason, as illustrated in FIG. 2B, when the position of the division line 201 changes from the dotted line to the solid line, there is a possibility that this change is erroneously determined as an error. That is, even though the position of the division line 201 has actually changed, it may be erroneously recognized that the position of the division line 201 shifts due to erroneous detection of the camera. As a result, the position of the division line is erroneously calculated, making it difficult to satisfactorily perform the self-driving. In view of this point, in order to generate an accurate map reflecting a positional shift of a division line, a map generation apparatus is configured as follows according to the present embodiment.

Figure 3:
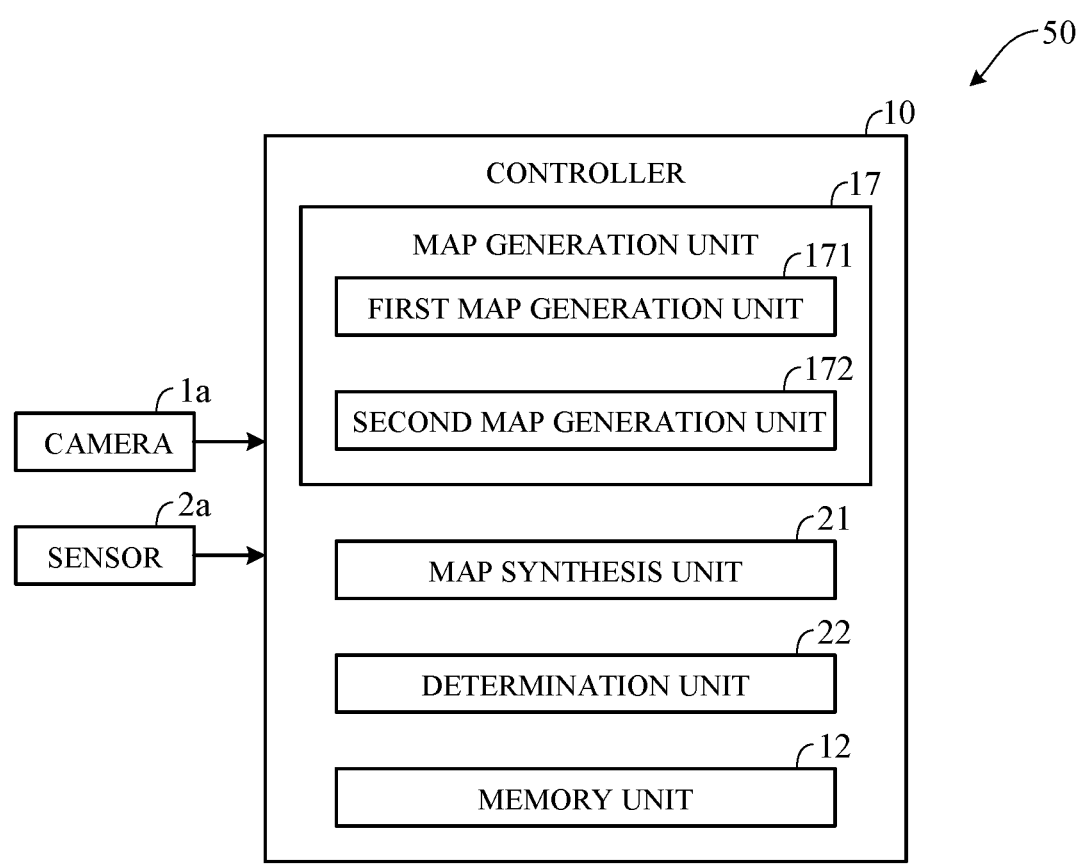
FIG. 3 is a block diagram illustrating a main configuration of the map generation apparatus according to the embodiment of the present invention.

FIG. 3 is a block diagram illustrating the configuration of main parts of a map generation apparatus 50 according to the present embodiment. The map generation apparatus is included in the vehicle control system 100 in FIG. 1. As illustrated in FIG. 3, the map generation apparatus 50 has a camera 1a, a sensor 2a and a controller 10.

The camera 1a is a monocular camera having an imaging element (image sensor) such as a CCD or a CMOS, and constitutes a part of the external sensor group 1 in FIG. 1. The camera 1a may be a stereo camera. The camera 1a is attached to, for example, a predetermined position in the front portion of the subject vehicle 101, continuously captures an image of a space in front of the subject vehicle 101, and acquires an image (camera image) of a target object. Based on the camera image, an object on a road surface such as the division line can be recognized. The division lines detected by the camera 1a include division lines 201 and 202 marked on the road surface as shown in FIG. 2A, and a division line 201 defined by an obstacle (a rod-shaped member above the road surface) on the road surface as shown by a solid line in FIG. 2B.

Further, it is possible to detect feature points around the subject vehicle by the camera image. That is, an edge indicating an outline of an object around the subject vehicle can be extracted based on the camera image, and feature points can be detected using the edge information. The object includes a moving object such as another vehicle, a bicycle, or a pedestrian, and a stationary object such as a building, a guardrail, or a traffic light, and can detect feature points of both the moving object and the stationary object by the camera image. Instead of the camera 1a or in addition to the camera 1a, a detection part such as a LIDAR may be used to recognize an object on the road surface or to detect a feature point.

The sensor 2a is a detection part used to calculate a movement amount and a movement direction of the subject vehicle 101. The sensor 2a is a part of the internal sensor group 2, and includes, for example, a vehicle speed sensor and a yaw rate sensor. That is, the controller 10 (subject vehicle position recognition unit 13) calculates the movement amount of the subject vehicle 101 by integrating a vehicle speed detected by the vehicle speed sensor, and calculates a yaw angle by integrating the yaw rate detected by the yaw rate sensor. Further, the controller 10 estimates the position of the subject vehicle by odometry when the map is created. Note that the configuration of the sensor 2a is not limited thereto, and the position of the subject vehicle may be estimated using information of another sensor.

The controller 10 in FIG. 3 has a map synthesis unit 21 and a determination unit 22 in addition to the memory unit 12 and the map generation unit 17, as a functional configuration of a processing unit 11 (FIG. 1). Since the map synthesis unit 21 and the determination unit 22 have a map generation function, these are included in the map generation unit 17 in FIG. 1. The map generation unit 17 includes a first map generation unit 171 and a second map generation unit 172.

The first map generation unit 171 generates a map including position information of the division line detected by the camera 1a. That is, by extracting edge image extending linearly along the traveling direction of the subject vehicle from the camera image, the first map generation unit 171 recognizes the division line, calculates the position of the division line with respect to the subject vehicle position, and thus generates the map. The division line includes not only a white line drawn on the road surface but also a boundary line between the road surface and the sidewalk. The map (referred to as a division line map) generated by the first map generation unit 171 is stored in the memory unit 12.

The second map generation unit 172 detects feature points of objects around the subject vehicle based on the camera image, calculates distances from the subject vehicle to the feature points, and thus generates the map including position information of the feature points. Specifically, the second map generation unit 172 generates the map from point cloud data generated by mapping using a technique such as Visual SLAM. At this time, the second map generation unit 172 determines whether the objects are moving objects, and generates a feature point cloud map only using feature points on surfaces of stationary objects while excluding objects determined as moving objects. The determination as to whether the objects are moving objects can be performed by determining whether the positions of the feature points have moved within a predetermined time. The map (referred to as a feature point map) generated by the second map generation unit 172 is stored in the memory unit 12.

The first map generation unit 171 and the second map generation unit 172 simultaneously generate the division line map and the feature point map. Therefore, the division line map and the feature point map obtained from the camera images at the same time point are stored in the memory unit 12.

The map synthesis unit 21 synthesizes the division line map generated by the first map generation unit 171 and the feature point map generated by the second map generation unit 172 to generate a synthetic map. The synthesis of the map means that a coordinate position of the division line map and a coordinate position of the feature point map are superimposed together. The synthetic map generated by the map synthesis unit 21 is stored in the memory unit 12.

Figure 4A:
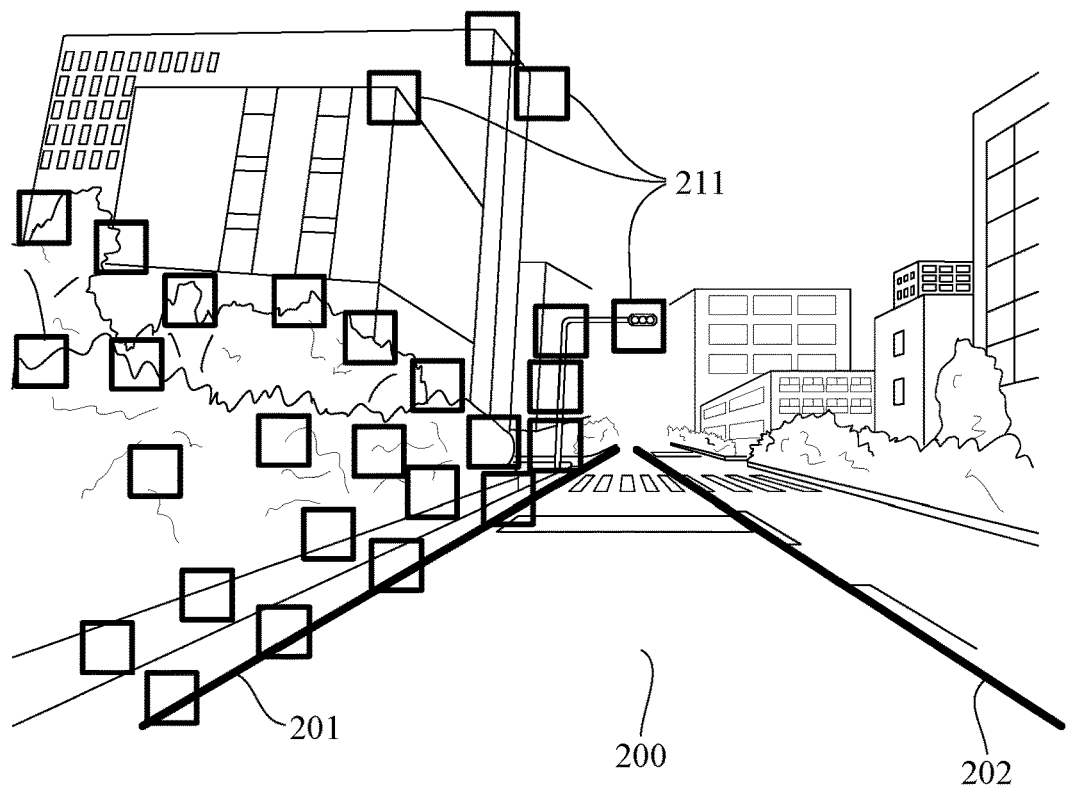
FIG. 4A is a diagram illustrating an example of a synthetic map generated by superimposing feature points on FIG. 2A.
Figure 4B:
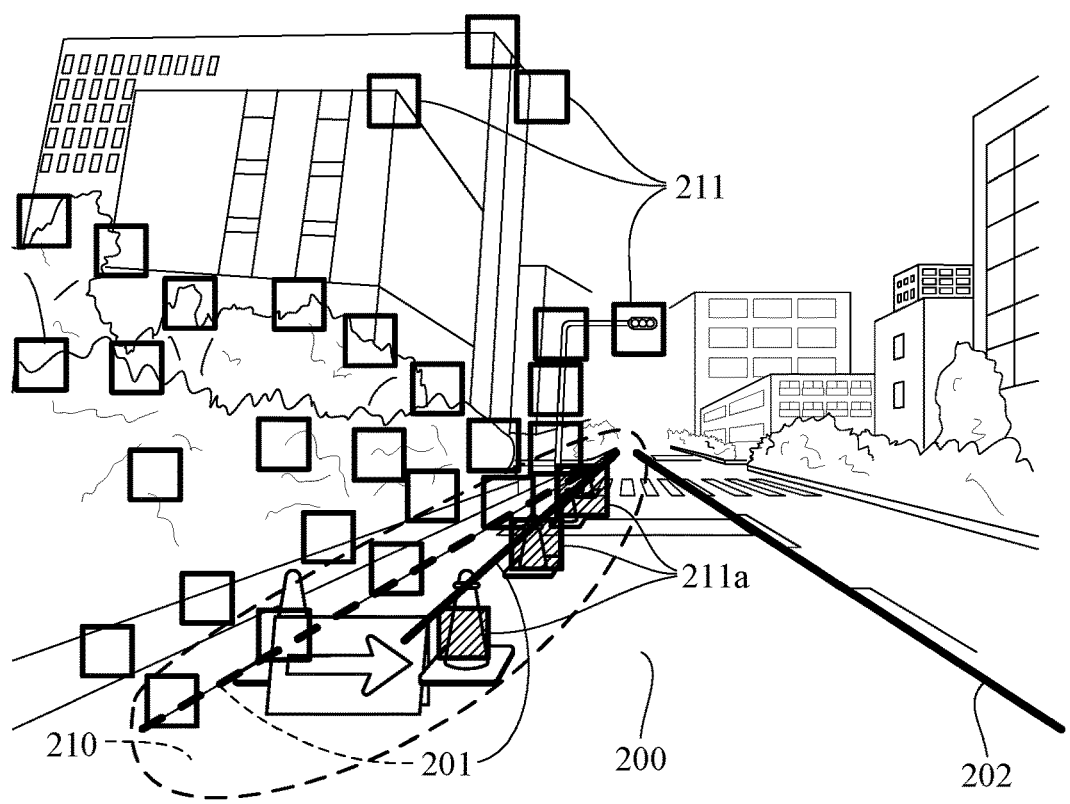
FIG. 4B is a diagram illustrating another example of the synthetic map generated by superimposing feature points on FIG. 2B.

FIG. 4A is a diagram illustrating an example of a synthetic map generated by a camera image obtained at the first time point T1, and FIG. 4B is a diagram illustrating an example of a synthetic map generated by a camera image obtained at the second time point T2. FIGS. 4A and 4B are maps for the same time points as FIGS. 2A and 2B, respectively, and the synthetic maps of FIGS. 4A and 4B are obtained by adding feature points to FIGS. 2A and 2B, respectively.

As illustrated in FIG. 4A, the synthetic map of the first time point T1 includes division lines 201 and 202 and a plurality of feature points 211. The feature points 211 correspond to a curbstone and a guardrail at a boundary between a road and a sidewalk, a street tree, a building, and the like. In FIG. 4A, the feature points 211 are emphasized for convenience. The synthetic map including position information of the division lines 201 and 202 and the feature points 211 illustrated in FIG. 4A, is temporarily stored in the memory unit 12.

As illustrated in FIG. 4B, the synthetic map of the second time point T2 includes division lines 201 and 202 and a plurality of feature points 211. FIG. 4B includes feature points 211 similar to those in FIG. 4A. Further, as indicated by hatching, FIG. 4B includes new feature points 211a, which are not included in FIG. 4A. The plurality of feature points 211a are located in an area 210 indicated by a dotted line within a predetermined range (distance) from the division line 201, and these feature points 211a correspond to an obstacle or a bar-shaped member indicating the division line 201 under road construction. Although not illustrated, feature points (e.g., feature points corresponding to street trees) outside the area 210 in FIGS. 4A and 4B may be different from each other.

The determination unit 22 determines whether a degree of difference between the synthetic map of the first time point T1 and the synthetic map of the second time point T2 is a predetermined degree or more. For example, the determination unit 22 compares a plurality of superimposed synthetic maps obtained at two different time points T1 and T2 for the same point to obtain a degree of difference between the two synthetic maps. Specifically, first, the determination unit 22 determines whether there is a shift by a predetermined value α or more between a position of a division line included in a division line map of the first time point T1 and a position of a division line included in a division line map of the second time point T2. The predetermined value a is, for example, several centimeters or several tens of centimeters.

When it is determined that the position of the division line shifts by the predetermined value a or more, the determination unit 22 determines whether a difference between a feature point included in a feature point map of the first time point T1 and a feature point included in a feature point map of the second time point T2 is greater than or equal to a predetermined value. More specifically, the determination unit 22 determines whether there is a difference by a predetermined value β or more between the first time point T1 and the second time point T2 in the number of feature points 211 in an area 210 within a predetermined range around a division line (e.g., the division line 201 in FIG. 4B) determined to have a variation by the predetermined value a or more. This determination includes not only a determination as to whether the number of feature points in the area 210 increases by the predetermined value β or more but also a determination as to whether the number of feature points in the area 210 decreases by the predetermined value β or more. Note that it may be determined whether the feature points are different by a predetermined value or more based on a change in positions of the feature points, rather than a change in the number of feature points between the first time point T1 and the second time point T2. That is, when the positions of the feature points in the area 210 shift by a predetermined value or more, the determination unit 22 may determine that the degree of difference is greater than or equal to the predetermined degree.

When the determination unit 22 determines that the degree of difference between the synthetic map of the first time point T1 and the synthetic map of the second time point T2 is the predetermined degree or more, the first map generation unit 171 stores the division line map of the second time point T2 in the memory unit 12 as a new division line map. As a result, the latest road map information, in which the positional shift of the division line due to road construction or the like is considered, is stored in the memory unit 12, and the subject vehicle can satisfactorily travel in a self-driving mode by using this map information.

Even if a positional shift of the division line is detected at the second time point T2, there is a possibility that the positional shift is detected due to erroneous detection of the camera 1a. On the other hand, when the position of the division line has actually shifted, a road structure around the division line must have changed. In view of this point, in the present embodiment, as described above, when a positional shift of a division line is detected, it is determined whether the position of the division line has shifted based on a degree of change in feature points around the division line. This makes it possible to accurately recognize a change in road structure.

Figure 5:
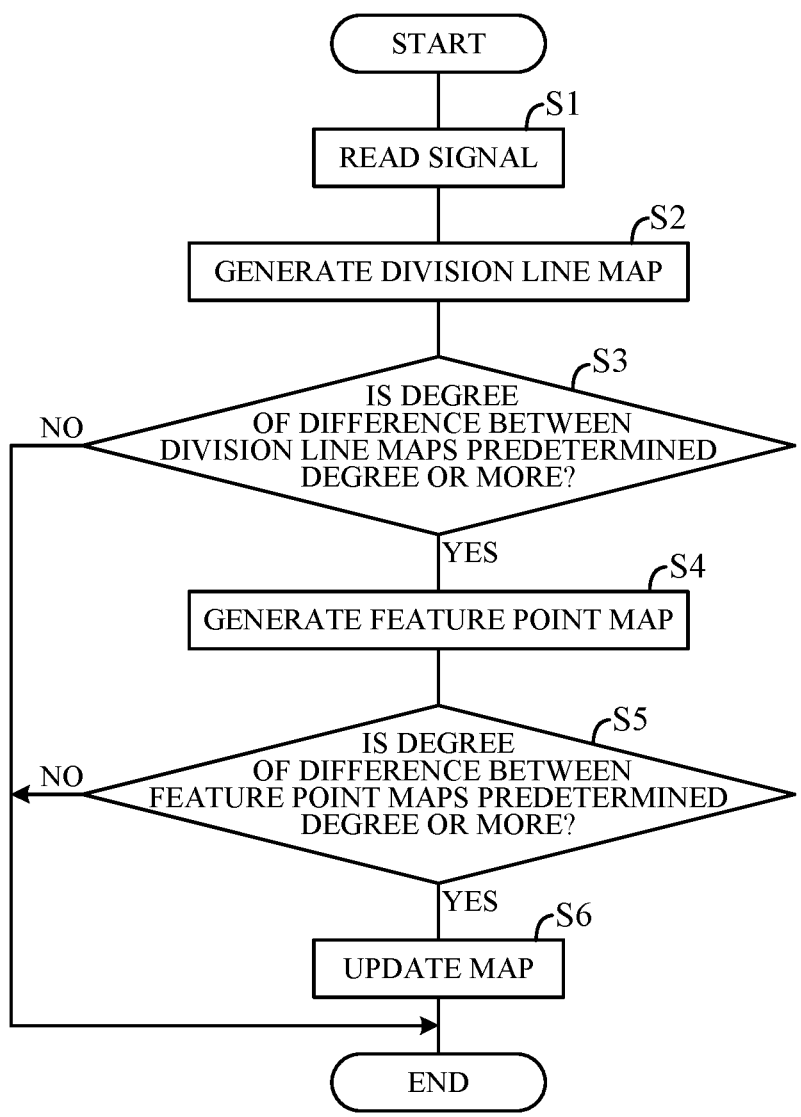
FIG. 5 is a flowchart illustrating an example of processing executed by a controller in FIG. 3.

FIG. 5 is a flowchart illustrating an example of processing performed by the controller 10 (CPU) of FIG. 3 in accordance with a predetermined program. The processing illustrated in this flowchart is started when the subject vehicle travels through a point on a synthetic map of a division line map and a feature point map based on a camera image at the first time point T1, in a manual driving mode, in a state where the synthetic map is stored in advance in the memory unit 12, and is repeated at a predetermined cycle.

First, in S1 (S: processing step), the controller 10 reads signals from the camera 1a and the sensor 2a. Next, in S2, the controller 10 generates a division line map by recognizing a division line based on a camera image, and calculating a position of the division line with respect to the position of the subject vehicle. Next, in S3, the controller 10 determines whether a degree of difference between the division line map generated in S2 and a division line map corresponding thereto in the pre-stored synthetic map, that is, the division line map generated in advance for the same point, is a predetermined degree or more. For example, the controller 10 determines whether the position of the division line has shifted by a predetermined value α or more. When the determination result in S3 is positive, the processing proceeds to S4, and when the determination result in S3 is negative, the processing ends.

In S4, the controller 10 generates a feature point map by detecting feature points of objects around the subject vehicle based on the camera image, and calculating distances from the subject vehicle to the feature points. At this time, the controller 10 generates a feature point map by determining whether the objects are moving objects, and removing feature points on surfaces of the moving objects. Next, in S5, the controller 10 determines whether a degree of difference between the feature point map generated in S4 and a feature point map corresponding thereto in the pre-stored synthetic map, that is, the feature point map generated in advance for the same point, is a predetermined degree or more. Specifically, the controller 10 determines whether a difference (e.g., a difference in number) from the feature points stored in advance is greater than or equal to a predetermined value β in an area within a predetermined range (distance) around the division line determined in S3 to have a positional shift by the predetermined degree or more.

When the determination result in S5 is positive, the processing proceeds to S6. In S6, the controller 10 rewrites the previously stored division line map with the division line map generated in S2, and ends the processing. That is, the controller updates the map information of the division line map stored in the memory unit 12. As a result, instead of the division line map generated based on the camera image at the first time point T1, the division line map generated in S2 (the division line map generated based on the camera image at the second time point T2) is stored in the memory unit 12. When the determination result in S5 is negative, there is a possibility that the position of the division line is erroneously detected by the camera 1a, and thus the processing ends without updating the map information of the division line map.

The operation of the map generation apparatus 50 according to the present embodiment will be described more specifically. When the subject vehicle travels in the manual driving mode at the first time point T1 for the purpose of map generation, a synthetic map including division lines 201 and 202 on the road surface and feature points 211 around the division lines as illustrated in FIG. 4A is stored in the memory unit 12. Thereafter, when the subject vehicle travels again, at the second time point T2, through the point where the subject vehicle traveled at the first time point T1, the following operation is performed.

At this time, as illustrated in FIG. 4B, when the position of the division line 201 has shifted by a predetermined value a or more due to road construction or the like, and new feature points 211a, which are not detected at first time point T1, are detected in the area 210 near the division line 201, it is determined that there is a positional shift of the division line 201 (S3 to S6). Therefore, the position information of the division line is changed, and the division line map is rewritten. In this way, when it is determined that there is a positional shift of the division line, it is possible to accurately determine whether the positional shift of the division line has actually occurred by determining whether there is a change in feature points around the division line. As a result, even when new map information is not acquired from the outside of the subject vehicle via the communication unit 7, traveling in the self-driving mode can be satisfactorily performed using the latest division line map.

According to the present embodiment, the following operational effects can be achieved.

(1) A map generation apparatus 50 includes: a camera 1a that detects division lines 201 and 202 on a road surface around a subject vehicle; a first map generation unit 171 that generates a map including position information of the division lines 201 and 202 detected by the camera 1a; a camera 1a that detects feature points of objects around the subject vehicle; a second map generation unit 172 that generates a map including position information of the feature points detected by the camera 1a; a memory unit 12 that stores a division line map generated by the first map generation unit 171 including the division lines 201 and 202 detected by the camera 1a at a first time point T1, and a feature point map generated by the second map generation unit 172 including the feature points 211 detected by the camera 1a at the first time point T1; and a determination unit 22 that determines whether the position of the division lines 201 and 202 on the road surface has changed based on a difference between the division line map stored in the memory unit 12 and a division line map generated by the first map generation unit 171 including the division lines 201 and 202 detected by the camera 1a at a second time point T2 after the first time point T1 (FIG. 3). When a degree of the difference between the division line map of the first time point T1 and the division line map of the second time point T2 is a predetermined degree or more, and a degree of difference between the feature point map stored in the memory unit 12 and a feature point map generated by the second map generation unit 172 including feature points 211 and 211a detected by the camera 1a at the second time point T2 is a predetermined degree or more, the determination unit 22 determines that the positions of the division lines 201 and 202 on the road surface have changed (FIG. 5).

As a result, when the position of the division line 201 actually has shifted between the first time point T1 and the second time point T2, the positional shift can be accurately determined. That is, it is possible to prevent the positional shift from being erroneously determined due to erroneous detection of the camera 1a. As a result, the map stored in advance in the memory unit 12 can be easily and accurately updated to a map reflecting road construction or the like. Further, if the subject vehicle travels for the purpose of map generation, the map can be frequently updated without acquiring map information from the outside.

(2) The determination unit 22 determines whether a degree of difference between the feature point map of the first time point T1 and a feature point map of the second time point T2 in an area 210 within a predetermined distance from the division line 201 included in the division line map of the second time point T2 is a predetermined degree or more. As a result, it is possible to ignore a change in the feature points at a place that is not related to a change in road structure, and it is possible to accurately determine whether there is a change in road structure such as a positional shift of the division line.

(3) When a difference between the number of feature points 211 in the area 210 within the predetermined distance included in the feature point map of the first time point T1 and the number of feature points 211 and 211a in the area 210 within the predetermined distance included in the feature point map of the second time point T2 is greater than or equal to a predetermined value β, or when an amount of a change in positions of feature points is greater than or equal to a predetermined value, the determination unit 22 determines that a degree of the difference is a predetermined degree or more. As a result, it is possible to easily determine whether there is a change in the feature points between the first time point T1 and the second time point T2.

(4) The feature points 211 detected by the camera 1a include feature points of moving objects and feature points of stationary objects. The second map generation unit 172 generates a map including position information of feature points excluding the feature points of the moving objects among the feature points 211 detected by the camera 1a. As a result, it is possible to generate a feature point map useful in determining a change in road structure.

The above embodiment can be varied into various forms. In the above embodiment, the division lines 201 and 202 on the road surface around the subject vehicle are detected by the external sensor group 1 such as a camera 1a, but the division lines may be detected by a LIDAR or the like. Therefore, the configuration of a division line detection part is not limited to the above configuration. In the above embodiment, the feature points 211 and 211a of the object around the subject vehicle are detected by the camera 1a, but the feature points may be detected by a LIDAR or the like. Therefore, the configuration of a feature point detection part is not limited to the above configuration. In the above embodiment, the division lines 201 and 202 and the feature points 211 and 211a are detected in the same camera 1a, but they may be detected by cameras different from each other. One of the division lines 201 and 202 and the feature points 211 and 211a may be detected by a camera, and the other may be detected by a LIDAR.

In the above embodiment, the first map generation unit 171 generates the division line map (a first time first map) including the division lines 201 and 202 detected at the first time point T1 and the division line map (a second time first map) including the division lines 201 and 202 detected at the second time point T2. However, the configuration of a first map generation unit may be any configuration as long as it generates a map including position information of a division line detected by a division line detection part. In the above embodiment, the second map generation unit 172 generates the feature point map (a first time second map) including the feature point 211 detected at the first time point T1 and the feature point map (a second time second map) including the feature points 211 and 211a detected at the second time point T2. However, the configuration of a second map generation unit may be any configuration as long as it generates a map including position information of feature points detected by a feature point detection part.

In the above embodiment, when a degree of the difference between the division line map of the first time point T1 and the division line map of the second time point T2 is a first predetermined degree (e.g., a predetermined value α) or more, and a degree of difference between the feature point map of the first time point T1 and a feature point map of the second time point T2, in an area within a predetermined range (distance) from the division line 201 included in the division line map of the second time point T2, is a second predetermined degree or more (e.g., degree of number of feature points is a predetermined value β), the determination unit 22 determines that the position of the division line on the road surface has changed. However, the configuration of a determination unit is not limited to the above configuration. Although in the above embodiment, the map generation apparatus 50 is applied to a case where the positional deviation of one of the pair of left and right division lines 201 and 202 occurs, the present invention can be similarly applied to a case where the positional deviations of both division lines occur. Note that a case where a new division line is generated or a case where an existing division line is erased is also included in a case where a positional deviation of the division line occurs.

In the above embodiment, the map generation unit 17 generates a map while the subject vehicle is traveling, but the data obtained by the camera image during traveling of the subject vehicle may be stored in the memory unit 12, and the map may be generated using the stored data after the subject vehicle has completed traveling. Therefore, it is not necessary to generate a map while traveling.

Although in the above embodiment, the subject vehicle having the self-driving capability includes the function as the map generation apparatus 50, a subject vehicle not having the self-driving capability may include a function as a map generation apparatus. In this case, the map information generated by the map generation apparatus 50 may be shared with another vehicle, and used for a driving assistance of the other vehicle (e.g., self-driving vehicle). That is, the subject vehicle may have only a function as the map generation apparatus 50.

The present invention can also be used as a map generation method including detecting a division line on a road surface around a vehicle, detecting feature points of an object around the vehicle, generating a first map including position information of the division line detected, and generating a second map including position information of the feature points detected, wherein the first map includes a first time first map including the position information of the division line detected at a first time point and a second time first map including the position information of the division line detected at a second time point later than the first time point, the second map includes a first time second map including the position information of the feature points detected at the first time point and a second time second map including the position information of the feature point detected at the second time point, wherein the map generation method further comprises storing the first time first map and the first time second map, and determining whether a position of the division line has changed, and wherein the determining includes determining that the position of the division line has changed when a degree of a difference between the first time first map stored in the memory and the second time first map is greater than or equal to a first predetermined degree and a degree of a difference between the first time second map stored in the memory and the second time second map is greater than or equal to a second predetermined degree.

According to the present invention, it is possible to accurately determine whether there is a shift in a position of a division line when a map is generated.

Above, while the present invention has been described with reference to the preferred embodiments thereof, it will be understood, by those skilled in the art, that various changes and modifications may be made thereto without departing from the scope of the appended claims.

What is claimed is:

1. A map generation apparatus, comprising:
a division line detection part detecting a division line on a road surface around a vehicle;
a feature point detection part detecting feature points of an object around the vehicle; and
an electronic control unit including a microprocessor and a memory connected to the microprocessor, wherein
the microprocessor is configured to perform:
generating a first map including position information of the division line detected by the division line detection part; and
generating a second map including position information of the feature points detected by the feature point detection part,
the first map includes a first time first map including the position information of the division line detected by the division line detection part at a first time point and a second time first map including the position information of the division line detected by the division line detection part at a second time point later than the first time point,
the second map includes a first time second map including the position information of the feature points detected by the feature point detection part at the first time point and a second time second map including the position information of the feature points detected by the feature point detection part at the second time point,
the memory is configured to store the first time first map and the first time second map,
the microprocessor is further configured to further perform
determining whether a position of the division line has changed;
updating map information on the division line in accordance with a determination result; and
outputting the map information on the division line to a self-driving vehicle, and the microprocessor is configured to perform
the determining including determining that the position of the division line has changed when a degree of a difference between the first time first map stored in the memory and the second time first map is greater than or equal to a first predetermined degree and a degree of a difference between the first time second map stored in the memory and the second time second map is greater than or equal to a second predetermined degree, and determining that the position of the division line has not changed when the degree of the difference between the first time second map and the second time second map is less than the second predetermined degree even if the degree of the difference between the first time first map and the second time first map is greater than or equal to the first predetermined degree.

2. The map generation apparatus according to claim 1, wherein
the microprocessor is configured to perform
the determining including determining whether the degree of the difference between the first time second map and the second time second map in an area within a predetermined distance from the division line included in the second time first map is greater than or equal to the second predetermined degree.

3. The map generation apparatus according to claim 2, wherein
the microprocessor is configured to perform
the determining including determining that the degree of the difference between the first time second map and the second time second map is greater than or equal to the second predetermined degree when a difference between a number of the feature points included in the first time second map in the area and a number of the feature points included in the second time second map in the area is greater than or equal to a predetermined value, or a difference of positions of the feature points included in the first time second map in the area and positions of the feature points included in the second time second map in the area is greater than or equal to a predetermined value.

4. The map generation apparatus according to claim 1, wherein
the feature points detected by the feature point detection part include a feature point of a moving object and a feature point of a stationary object, and
the microprocessor is configured to perform
the generating including generating the second map including position information of a feature point obtained by excluding the feature point of the moving object among the feature points detected by the feature point detection part.

5. The map generation apparatus according to claim 1, wherein
the memory is configured to store the second time first map in place of the first time first map when it is determined that the position of the division line has changed.

6. The map generation apparatus according to claim 1, wherein
the division line detection part and the feature point detection part are configured by a same camera mounted on the vehicle.

7. The map generation apparatus according to claim 1, wherein
the division line detected by the division line detection part includes the division line marked on the road surface and the division line defined by obstacles on the road surface.

8. A map generation method, comprising:
detecting a division line on a road surface around a vehicle;
detecting feature points of an object around the vehicle;
generating a first map including position information of the division line detected; and
generating a second map including position information of the feature points detected, wherein
the first map includes a first time first map including the position information of the division line detected at a first time point and a second time first map including the position information of the division line detected at a second time point later than the first time point,
the second map includes a first time second map including the position information of the feature points detected at the first time point and a second time second map including the position information of the feature point detected at the second time point,
the map generation method further comprises:
storing the first time first map and the first time second map;
determining whether a position of the division line has changed;
updating map information on the division line in accordance with a determination result; and
outputting the map information on the division line to a self-driving vehicle, and
the determining includes determining that the position of the division line has changed when a degree of a difference between the first time first map stored in the memory and the second time first map is greater than or equal to a first predetermined degree and a degree of a difference between the first time second map stored in the memory and the second time second map is greater than or equal to a second predetermined degree, and determining that the position of the division line has not changed when the degree of the difference between the first time second map and the second time second map is less than the second predetermined degree even if the degree of the difference between the first time first map and the second time first map is greater than or equal to the first predetermined degree.

* * * * *